United States Patent [19]

Sato et al.

[11] Patent Number: 4,597,829

[45] Date of Patent: Jul. 1, 1986

[54] STENCIL, STENCIL MATERIAL KIT AND STENCIL DUPLICATOR KIT CONTAINING THE SAME

[75] Inventors: Morio Sato; Tatsuya Igawa, both of Kanagawa, Japan

[73] Assignee: Pilot Man-Nen-Hitsu Kabushiki Kaisha, Tokyo, Japan

[21] Appl. No.: 709,278

[22] Filed: Mar. 7, 1985

Related U.S. Application Data

[60] Continuation-in-part of Ser. No. 601,880, Apr. 19, 1984, abandoned, which is a division of Ser. No. 540,979, Oct. 11, 1983, Pat. No. 4,550,660.

[30] Foreign Application Priority Data

Oct. 8, 1982 [JP] Japan ................................ 57-176405
Dec. 28, 1982 [JP] Japan ........................... 57-200779[U]

[51] Int. Cl.⁴ ......................... B44C 1/22; C03C 15/00; C03C 25/06; B29C 17/08

[52] U.S. Cl. ................................. 156/644; 101/128.4; 156/345; 156/654; 156/659.1; 156/668; 156/658; 156/904; 156/905

[58] Field of Search ............... 156/345, 640, 644, 654, 156/655, 659.1, 658, 668, 904, 905; 101/127, 128.21, 128.4; 430/308; 206/527; 252/79.2, 79.4

[56] References Cited

U.S. PATENT DOCUMENTS 2,141,020 12/1938 Robertson ........................... 156/658
3,179,729 4/1965 Richardson .................. 156/659.1 X
3,579,394 5/1971 Nelson ................................ 156/658
4,230,781 10/1980 Piascinski et al. ............. 156/644 X

*Primary Examiner*—William A. Powell
*Attorney, Agent, or Firm*—Sughrue, Mion, Zinn, Macpeak, and Seas

[57] ABSTRACT

This invention provides stencil from which a patternwise perforated stencil can be easily made by handwriting, a stencil material kit with which a patternwise perforated stencil can be made, and a stencil duplicator kit which, in combination with the stencil, performs simple, clear printing. The stencil is made up of a porous support and a masking film formed thereon, said masking film being made of a water-insoluble polymer having tertiary amino groups. The stencil material kit contains the stencil and a patternwise perforated stencil-making solution which forms a water-soluble product upon reaction with said polymer. Stencil printing is performed using the patternwise perforated stencil, a stencil duplicator and printing ink.

17 Claims, 3 Drawing Figures

FIG.1
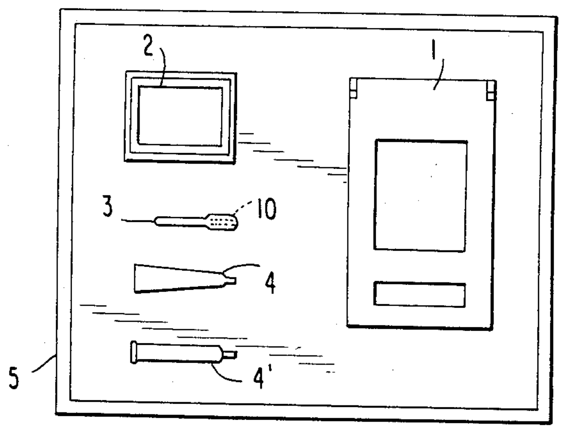
FIG.2
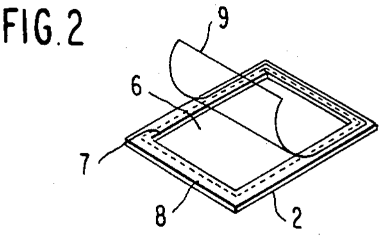
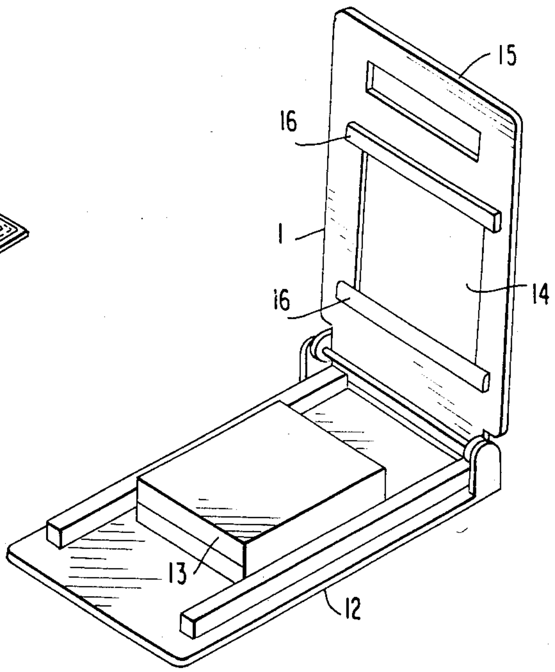
FIG.3

STENCIL, STENCIL MATERIAL KIT AND STENCIL DUPLICATOR KIT CONTAINING THE SAME

CROSS REFERENCE TO RELATED APPLICATION

This is a continuation-in-part of U.S. patent application Ser. No. 601,880, filed Apr. 19, 1984, now abandoned, which is a divisional of U.S. patent application Ser. No. 540,979 filed Oct. 11, 1983, U.S. Pat. No. 4,550,660.

FIELD OF THE INVENTION

The present invention relates to a stencil from which a patternwise perforated stencil can be easily made by handwriting, or etc., a stencil material kit with which the patternwise perforated stencil can be made, and a stencil duplicator kit which, in combination with the stencil, performs simple, clear printing.

BACKGROUND OF THE INVENTION

Among many known printing systems, letter press printing and stencil printing are simplest. Nevertheless, these systems are not desirable because plate making or patternwise perforated stencil-making is complex and difficult and printing cannot be accomplished as desired.

According to the conventional patternwise perforated stencil-making method for stencil printing, letters are handwritten on wax-coated Japanese paper as stencil using a steel pen or a ball-point pen so that the wax is mechanically removed and fine holes are made. According to another patternwise perforated stencil-making method, the wax is removed by dissolving it with a solvent. In the former case, it is difficult to form, on the stencil, lines thicker than the tip of the pen. Therefore, thick lines and delicate lines drawn by a brush or patterns of large area cannot be formed on the stencil. Moreover, it lacks sharpness. In the latter case, the slow-dissolving wax is not removed completely when the solvent is applied to the stencil at the ordinary handwriting speed. In addition, the solvent is harmful.

According to the other patternwise perforated stencil-making method, a desired pattern is painted on a net support with a crayon, then the support is entirely coated with glue, and, after the glue is dry, the crayon is removed by dissolving it with a solvent. This is called the Tusche and glue method. This method is complex and difficult, and involves the problem of using a solvent.

SUMMARY OF THE INVENTION

The present invention has been completed based on the findings that a water-insoluble polymer containing tertiary amino groups reacts with an acid to form a water-soluble reaction product. According to this invention, patternwise perforated stencil-making is accomplished by bringing a new patternwise perforated stencil-making solution, which is a water-soluble acid solution, into contact with the new stencil, which is stable until contact with the acid solution, in addition, printing is accomplished as desired using the patternwise perforated stencil.

It is an object of this invention to provide stencil from which a patternwise perforated stencil for patterns such as letters or designs of sharp fine or thick lines can be easily made by handwriting and stamping and other simple means.

It is another object of the invention to provide a stencil material kit composed of stencil and a patternwise perforated stencil-making solution.

It is yet another object of this invention to provide a stencil duplicator kit which, in combination with the patternwise perforated stencil made as above, printing ink, and a stencil duplicator, performs clear printing.

BRIEF DESCRIPTION OF THE DRAWING

FIG. 1 is a plane view of the stencil duplicator kit of this invention.

FIG. 2 is a perspective view of the assembled plate.

FIG. 3 is a perspective view of the press type stencil duplicator.

DETAILED DESCRIPTION OF THE INVENTION

The stencil of this invention is made up of a porous support and a masking film of water-insoluble polymer containing tertiary amino groups.

The stencil material kit of this invention is made up of the stencil made up of a porous support and a masking film of water-insoluble polymer having tertiary amino groups, and a patternwise perforated stencil-making solution which forms a water-soluble product upon reaction with said polymer.

The stencil duplicator kit of this invention is made up of the stencil made up of a porous support and a masking film of water-insoluble polymer having tertiary amino groups; the patternwise perforated stencil-making solution which forms a water-soluble product upon reaction with said polymer; and a stencil duplicator and printing ink.

The stencil printing used in this invention means the process of producing visual printed matters by using a patternwise perforated stencil and color printing ink. It also means printing with colorless dye-intermediate ink, adhesive ink, color-forming ink, heat-sensitive ink, or reversible thermochromic ink. It also includes textile printing.

The water-insoluble polymer having tertiary amino groups includes polyester, polyether, polyamide, and polyurethane, each having tertiary amino groups; tertiary aminoalkyl acrylate polymer; and a homopolymer or copolymer of vinylpyridine. This water-insoluble polymer is made into the masking film on the porous support.

Preferred examples of the water-insoluble polymer having tertiary amino groups include an esterification product of a diol containing a tertiary amino group and a dicarboxylic acid; a polycondensate of a diol containing a tertiary amino group; a polycondensate of a diamino containing a tertiary amino group and a dicarboxylic acid; a polymerizate of a glycol containing a tertiary amino group and a diisocyanate; a homopolymer of tertiary aminoalkyl acrylate; copolymers of tertiary aminoalkyl acrylate and monoethylenic monomer such as acryl monomer and/or styrene monomer; a homopolymer of 2-vinylpyridine or 4-vinylpyridine; and copolymers of 4-vinylpyridine and/or 2-vinylpyridine and monoethylenic monomer. These polymers are insoluble in water and stable per se.

The porous support on which is formed the masking film of the above-mentioned polymer is Japanese paper, nylon cloth, polyester cloth [particularly, Tetoron (trade name) which is manufactured and sold by Toray Industries, Inc. and Teijin Limited], nonwoven cloth, and other porous materials. The porous support should preferably have a thickness of 20 to 1500 μm and a porosity of 25 to 80%.

The masking film is formed on the porous support by applying a solution of the polymer directly to the porous support, followed by drying, or by dipping the porous support in a solution of the polymer, followed by drying. In the other methods, the solution is replaced by an emulsion, or the polymer is formed into a film and the film is bonded to the porous support by heat sealing or with an adhesive. The masking film of the polymer should be as thin as possible so long as the patternwise perforated stencil has the durability required for printing. The coating amount of the polymer should preferably be 3 to 20 $g/m^2$.

Useful polymer solvents include aromatic hydrocarbons such as benzene, toluene, and xylene; ketones such as methyl ethyl ketone and acetone; alcohols such as methanol and ethanol; ethers such as ether and tetrahydrofuran; esters such as ethyl acetate; halogenated hydrocarbons such as trichloroethylene; and highly polar solvents such as dimethyl sulfoxide and dimethylformamide. The concentration of polymer in the solution or emulsion should preferably be from 10 to 40%.

The present invention provides a stencil material kit which is made up of the above-mentioned stencil and patternwise perforated stencil-making solution.

According to this invention, an aqueous acid solution is used for patternwise perforated stencil-making. The solvent for the acid solution may be water, alcohols, polyols, polyol ethers, and others. The solvent can be used in combination therewith.

The acid in the acid solution reacts with the above-mentioned polymer to give a water-soluble product. The water-soluble acid should have a dissociation constant of from $1.0\times10^{-5}$ to $1.0\times10^{-1}$. Examples of such acids include inorganic acids such as hydrochloric acid, sulfuric acid, phosphoric acid; and organic acids such as formic acid, acetic acid, propionic acid, chloroacetic acid, dichloroacetic acid, trichloroacetic acid, glycolic acid, lactic acid, oxalic acid, malonic acid, succinic acid, fumaric acid, maleic acid, malic acid, tartaric acid, and citric acid.

The concentration of the acid should preferably be from 3% to 50%. If the concentration is lower than 3%, the acid solution does not form satisfactory holes on the stencil and the letters or patterns on the stencil become blurred.

Preferable acids among these acids are citric acid and tartaric acid from the standpoint of safety.

When the patternwise perforated stencil-making solution is brought into contact with the masking film on the stencil, the polymer of the masking film rapidly reacts with the acid in the patternwise perforated stencil-making solution to give a product which is soluble in water and water-soluble liquid. This reaction product is removed by water or a water-soluble liquid. Thus, there is obtained a patternwise perforated stencil.

Desired letters or designs are drawn on the stencil with the patternwise perforated stencil-making solution. In order that the patternwise perforated stencil-making solution spreads uniformly on the masking film of the polymer, it is preferable to add a surface active agent to the patternwise perforated stencil-making solution. Moreover, in order that the patternwise perforated stencil-making solution is visible on the masking film, it is preferable to add a small amount of dye to the patternwise perforated stencil-making solution. The patternwise perforated stencil-making solution may be used as such, may be placed into a felt pen or marker pen for handwriting or may be put on a writing brush. Moreover, it may be applied by using an open-cell foam or by using a stamp and stamp pad.

So that the patternwise perforated stencil-making solution completely wets the pen or the felt etc., and stays in the felt, etc., without evaporation, a humectant such as glycol should be preferably added. The concentration of the humectant should preferably be from 5% to 20%.

Described below is a method for preparing a patternwise perforated stencil for desired letters or designs by using the stencil material kit of this invention.

When the patternwise perforated stencil-making solution is brought into contact with the masking film on the stencil, the polymer of the masking film rapidly reacts with the acid in the patternwise perforated stencil-making solution to give a product which is soluble in water and water-soluble liquid. The water-soluble liquid that solubilizes the reaction product is water; an aqueous solution containing at least one of polyol, surface active agent, humectant and water-soluble resin; water-soluble paste containing polymer emulsion; or water-soluble printing ink. The patternwise perforated stencil-making solution is applied to the stencil by using a pen, felt pen or brush filled with the patternwise perforated stencil-making solution, by using a porous stamp filled with the patternwise perforated stencil-making solution, by using a stamp and a stamp pad filled with the patternwise perforated stencil-making solution, or by spraying.

That part of the stencil to which the patternwise perforated stencil-making solution has been applied becomes soluble in water or water-soluble liquid. That part which has become soluble is removed by dipping the stencil in water for several seconds or by rubbing the stencil with a sponge or cotton moistened with water. The stencil is then dried. Thus, there is obtained a patternwise perforated stencil having sharp letters or patterns. The same results as above can be obtained when the water is replaced by the above described aqueous solution or water-soluble paste.

When a thin pen is used to apply the patternwise perforated stencil-making solution, it is possible to make holes in a thin line; and when a brush is used, it is possible to make holes in a thick line. Lines of any desired thickness can be draw easily.

The stencil material kit of this invention makes it possible for one to easily make a patternwise perforated stencil by handwriting or stamping desired letters or patterns on the stencil.

The present invention provides a stencil duplicator kit which is made up of a stencil, patternwise perforated stencil-making solution, a stencil duplicator and stencil printing ink.

Described below is a method for performing printing with printing ink by using the patternwise perforated stencil prepared as mentioned above.

The printing ink may be any oil-base ink, water-base ink, or emulsion-type ink for stencil, which may vary in viscosity from semifluid to paste and semisolid. The printing ink is required not to break into the masking film of polymer.

The printing ink is placed on the patternwise perforated stencil positioned on the printing paper, and the printing ink is squeezed or pressed simply by a flat board. Thus, there is obtained clear printed matter. In other words, the duplicator may be of the squeeze type, roll type, or press type. The press type is most suitable because of its simplicity.

The stencil duplicator kit is described in detail in the following: FIG. 1 is a plan view of the kit, in which there are shown a duplicator 1, an assembled plate 2, a writing tool 3, ink tubes 4 and 4', and a container 5. A collection of printed cuts (letters and patterns) may be included in the container.

The assembled plate 2 shown in FIG. 2 is made up of a frame 8 having a window 7, the above-mentioned square stencil or patternwise perforated stencil 6, with all the sides attached to one face of the frame 8, and a sheet 9, particularly, a square flexible transparent polyvinyl chloride sheet, with one side attached to the other face of the frame 8 so that it can be separated from the stencil or patternwise perforated stencil.

The writing tool 3 contains a fibrous substance impregnated with the patternwise perforated stencil-making solution and has a pen tip 10 made of felt or plastics. The writing tool 3 may have one pen for fine letters at one end and one pen for large letters at another end.

The stencil duplicator 3 shown in FIG. 3 is made up of a base 12, a resilient body 13 attached to the base whose upper surface has an appropriate adhesion, and a pressing board 15 having a window 14. The pressing board 15 is pivotally mounted on the base 12. The assembled plate 2 is detachably mounted on the inside of the pressing board 15 by means of holders 16.

The printing operation with the assembled plate and duplicator is accomplished as follows: The printing ink of desired color is applied to the patternwise perforated stencil from the printing ink tube 4 (more than one color may be used). The ink on the patternwise perforated stencil is covered with the sheet 9. The assembled plate is mounted on the holders 16 on the pressing board 15. Printing paper is placed on the resilient body 13. The pressing board 15 is swung down toward the base 12 so that the patternwise perforated stencil 6 comes into contact with the printing paper. The patternwise perforated stencil 6 is pressed from above, and the printing ink is extruded from the holes of the patternwise perforated stencil 6. Thus, there is obtained a printed sheet having a desired pattern.

The printing operation may also be accomplished by using a squeeze roller type duplicator instead of a press type duplicator.

When a water-base ink of water-soluble paste containing water and/or polyols, etc., is used as the printing ink, it is possible to perform patternwise perforated stencil-making and printing simultaneously. In other words, after desired patterns are drawn or letters are written on the stencil with the patternwise perforated stencil-making solution, the stencil is supplied with the printing ink, without undergoing water treatment, and then mounted on the pressing board for printing as mentioned above.

According to this method, that part of the patternwise perforated stencil which has been made soluble in water or water-soluble liquid by the patternwise perforated stencil-making solution is dissolved by water or polyol in the printing ink and transferred together with the printing ink to the printing paper by the printing pressure. This method is advantageous in that the step of water treatment and the subsequent drying steps are omitted.

The invention is now described in more detail with reference to the following nonlimitative examples.

EXAMPLE 1

The stencil was prepared as follows: 82 parts of dimethylaminoethyl methacrylate and 78 parts of methyl methacrylate were copolymerized (molar ratio 4:6) in the usual way by using azobis-2,4-dimethylvaleronitrile as the polymerization catalyst. The resulting copolymer was dissolved in toluene to make a 10% solution. This solution was applied to a 270-mesh polyester (Tetoron) screen at a coating amount of 9 $g/m^2$, followed by drying. Thus, there was obtained stencil.

On the other hand, the patternwise perforated stencil-making solution was prepared by dissolving 7.5 parts of citric acid, 0.04 part of blue dye, and 0.05 part of Emalgen 810 (surface active agent produced by Kao Atlas Co., Ltd.) in 10 parts of water. This solution was placed into a felt pen. By using this felt pen, letters were written on the stencil. Water-base ink (manufactured by Megami Ink Co., Ltd., having a one-minute value of 28 mm as measured by a parallel plate viscometer at 25° C.) was placed directly on the letters. Printing was performed by using a press type stencil duplicator. After trial printing of three sheets, the letters written with the patternwise perforated stencil-making solution were made completely porous. The letters were exactly and sharply duplicated. One inking provided 30 printed sheets.

EXAMPLE 2

The stencil was prepared as follows: Diethylaminoethyl methacrylate was polymerized in the usual way by using azobis-2,4-dimethylvaletonitrile as the polymerization catalyst. The resulting polymer was dissolved in methyl ethyl ketone to make a 15% solution. In this solution was dipped a 300-mesh nylon screen, followed by drying. The coating amount was 10 $g/m^2$. Thus, there was obtained stencil.

On the other hand, the patternwise perforated stencil-making solution was prepared by dissolving 3 parts of maleic acid and 0.02 part of blue dye in 10 parts of ethylene glycol. This solution was placed into a felt pen. By using this felt pen, a pattern was drawn by tracing a cut placed under the stencil. The stencil was rubbed with a sponge moistened with water so that the pattern drawn by the felt pen was made porous. The stencil was dried. Thus, there was obtained a patternwise perforated stencil.

Printing was performed by using this patternwise perforated stencil mounted on a press type stencil duplicator and oil-base ink (manufactured by Megami Ink Co., Ltd., having a one-minute value of 36 mm as measured by a parallel plate viscometer at 25° C.). The pattern was exactly and sharply duplicated. One inking provided 40 printed sheets.

EXAMPLE 3

The stencil was prepared as follows: 72 parts of dimethylaminoethyl methacrylate and 52 parts of styrene were copolymerized (molar ratio 1:1) in the usual way by using azobis-2,4-dimethylvaleronitrile as the polymerization catalyst. The resulting copolymer was dissolved in toluene to make a 10% solution. This solution was applied to a 230-mesh polyester (Tetoron) screen at a coating amount of 10 $g/m^2$, followed by drying. Thus, there was obtained stencil.

On the other hand, the patternwise perforated stencil-making solution was prepared by dissolving 10 parts of malonic acid, 4 parts of glycerin, and 0.05 part of blue dye in 16 parts of water. This solution was placed on a stamp pad. By using this stamp pad and a stamp having a desired pattern, the patternwise perforated stencil-making solution was applied to the stencil. Then the stencil was dipped in water for several seconds so that the stamped part was made porous. The stencil was dried. Thus, there was obtained a patternwise perforated stencil on which the stamp pattern was sharply reproduced.

Printing was performed using this patternwise perforated stencil mounted on a squeeze type stencil duplicator and water-base ink (manufactured by Murakami Screen Co., Ltd., having a one-minute value of 38 mm as measured by a parallel plate viscometer at 25° C.). The stamped pattern was exactly and sharply duplicated. One inking provided 20 printed sheets.

EXAMPLE 4

The stencil was prepared as follows: 10 parts of poly-4-vinylpyridine was dissolved in 90 parts of methanol to make a 10% solution. This solution was applied to a 300-mesh nylon screen at a coating amount of 9 g/m$^2$, followed by drying. Thus, there was obtained stencil.

On the other hand, the patternwise perforated stencil-making solution was prepared by dissolving 0.02 part of blue dye in 10 parts of 2N hydrochloric acid. This solution was put into a felt pen. By using this felt pen, letters were written on the stencil. The same water-base ink as used in Example 1 was placed directly on the letters. Printing was performed using a press type stencil duplicator. After trial printing of three sheets, the letters written with the patternwise perforated stencil-making solution were made completely porous. The letters were exactly and sharply duplicated. One inking provided 30 printed sheets.

EXAMPLE 5

The stencil was prepared as follows: 4-vinylpyridine-acrylonitrile copolymer (molar ratio 1:1) was dissolved in dimethylsolfoxide to make a 10% solution. This solution was applied to a 270-mesh polyester screen at a coating amount of 11 g/m$^2$, followed by drying. Thus, there was obtained stencil.

On the other hand, the patternwise perforated stencil-making solution was prepared by dissolving 4 parts of tartaric acid, 0.03 part of Emalgen 810, and 0.01 part of red dye in 4 parts of ethanol and 10 parts of water. This solution was put on a writing brush. By using this writing brush, letters were written on the stencil. Then the stencil was dipped in water for several seconds so that the letters were made porous. The stencil was dried. Thus, there was obtained a patternwise perforated stencil on which the letters were sharply reproduced.

Printing was performed by using this patternwise perforated stencil mounted on a squeeze type stencil duplicator and oil-base ink (manufactured by Jujo Kako Co., Ltd., 200-series Q kit ink diluted with an aliphatic hydrocarbon solvent, having a one-minute value of 43 mm as measured by a parallel plate viscometer). The letters were exactly and sharply duplicated. One inking provided 50 printed sheets.

EXAMPLE 6

The stencil was prepared as follows: 65 parts of dimethylaminoethyl methacrylate, 12 parts of methyl methacrylate, and 23 parts of butyl methacrylate were copolymerized in the usual way by using azobis-2,4-dimethylvaleronitrile as the polymerization catalyst. The resulting terpolymer was dissolved in toluene to make a 15% solution. This solution was applied to a 200-mesh polyester (Tetoron) screen at a coating amount of 8 g/m$^2$, followed by drying. Thus, there was obtained stencil.

The patternwise perforated stencil was prepared in the same way as in Example 5.

Printing was performed by using this patternwise perforated stencil mounted on a roller type stencil duplicator and water-base ink (Sakura Matt water colors manufactured by Sakura Kurepasu Co., Ltd.). The letters were exactly and sharply duplicated. One inking provided 20 printed sheets.

While the invention has been described in detail and with reference to specific embodiments thereof, it will be apparent to one skilled in the art that various changes and modifications can be made therein without departing from the spirit and scope thereof.

What is claimed is:

1. A method of preparing a patternwise perforated stencil which comprises:

drawing a pattern using a patternwise perforated stencil-making solution comprising a water-soluble acid solution, on a stencil comprising a porous support and a masking film formed on the support, wherein the masking film comprises a water-insoluble polymer containing tertiary amino groups, wherein said polymer is one which can be made soluble in water or an aqueous solution upon contacting with an acid; and removing the resulting patternwise reaction product by using water or an aqueous solution.

2. The method as claimed in claim 1, wherein the water-insoluble polymer containing tertiary amino groups is a polymer selected from the group consisting of:

polyester, polyether, polyamide and polyurethane, each containing tertiary amino groups, tertiary aminoalkyl acrylate polymer; and homopolymers and copolymers of vinylpyridine.

3. The method as claimed in claim 2, wherein the water-insoluble polymer containing tertiary amino groups is selected from the group consisting of:

an esterification product of a diol containing a tertiary amino group and a dicarboxylic acid;

a polycondensate of a diol containing a tertiary amino group;

a polycondensate of a diamine containing a tertiary amino group and a dicarboxylic acid;

a polymerizate of a glycol containing a tertiary amino group and a diisocyanate;

a homopolymer of tertiary aminoalkyl acrylate;

a copolymer of tertiary aminoalkyl acrylate and a monoethylenic monomer;

a homopolymer of 2-vinylpyridine;

a homopolymer of 4-vinylpyridine;

a copolymer of 4-vinylpyridine and a monoethylenic monomer;

a copolymer of 2-vinylpyridine and a monoethylenic monomer; and a copolymer of 4-vinylpyridine, 2-vinylpyridine and monoethylenic monomer.

4. The method as claimed in claim 1, wherein the porous support is a support selected from the group consisting of Japanese paper, nylon cloth, polyester cloth, and nonwoven cloth.

5. The method as claimed in claim 1, wherein the porous support is about 20 to 1,500 $\mu$m thick.

6. The method as claimed in claim 1, wherein the porous support has a porosity of about 25 to 80%.

7. The method as claimed in claim 1, wherein the water-insoluble polymer is present on the support in an amount in the range of 3 to 20 g/m$^2$.

8. The method as claimed in claim 1, wherein the patternwise perforated stencil-making solution comprises an acid and a solvent, wherein the solvent is selected from the group consisting of water, alcohols, polyols and polyol ethers.

9. The method as claimed in claim 8, wherein the acid is an inorganic acid selected from the group consisting of hydrochloric acid, sulfuric acid, phosphoric acid, and an organic acid selected from the group consisting of formic acid, acetic acid, propionic acid, chloroacetic acid, dichloroacetic acid, trichloroacetic acid, glycolic acid, lactic acid, oxalic acid, malonic acid, succinic acid, fumaric acid, maleic acid, malic acid, tartaric acid, and citric acid.

10. A method as claimed in claim 8, wherein the acid is present in the patternwise perforated stencil-making solution in an amount of from 3% to 50%.

11. The method as claimed in claim 8, wherein the patternwise perforated stencil-making solution further comprises a surface active agent.

12. The method as claimed in claim 8, wherein the patternwise perforated stencil-making solution further comprises a dye.

13. The method as claimed in claim 8, wherein the patternwise perforated stencil-making solution further comprises a humectant.

14. The method as claimed in claim 1, wherein the aqueous solution for removing the resulting patternwise reaction product is a water-soluble printing ink.

15. The method as claimed in claim 1, wherein the pattern on the stencil is drawn by hand by using a writing tool containing the pattern wise perforated stencil-making solution.

16. The method as claimed in claim 1, wherein the pattern on the stencil is drawn by using a porous stamp filled with the patternwise perforated stencil-making solution or by using a stamp and a stamp pad filled with the patternwise perforated stencil-making solution.

17. The method as claimed in claim 1, wherein the pattern on the stencil is drawn by spraying the patternwise perforated stencil-making solution.

* * * * *